United States Patent
Wu

(10) Patent No.: US 7,549,015 B2
(45) Date of Patent: Jun. 16, 2009

(54) SYSTEMS AND METHOD FOR CONTROLLING DIRECTORY CAPACITIES WITH AN ACCURACY TOLERANT RATIO

(75) Inventor: Cheng-Meng Wu, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 861 days.

(21) Appl. No.: 11/193,889

(22) Filed: Jul. 29, 2005

(65) Prior Publication Data
US 2006/0026222 A1 Feb. 2, 2006

(30) Foreign Application Priority Data
Jul. 30, 2004 (TW) ............................... 93122888 A

(51) Int. Cl.
G06F 13/00 (2006.01)
(52) U.S. Cl. ...................... 711/112; 707/205; 711/170
(58) Field of Classification Search ....................... None
See application file for complete search history.

(56) References Cited

U.S. PATENT DOCUMENTS 6,629,105 B1   9/2003   Young et al. ................ 707/103
7,373,409 B2 * 5/2008   Miyake et al. .............. 709/229

* cited by examiner

Primary Examiner—Reginald G Bragdon
Assistant Examiner—Thanh D Vo

(57) ABSTRACT

A method for controlling directory capacities with an accuracy tolerant ratio includes the steps of: applying for a capacity; linking to a directory; checking whether a remaining capacity is greater than or equal to the applied capacity; updating an occupied capacity of the directory if the remaining capacity is greater than or equal to the applied capacity; checking whether the occupied capacity is greater than an accuracy tolerance of difference between a report capacity and an allocated capacity; updating the report capacity of the directory if the occupied capacity is greater than the accuracy tolerance; checking whether the directory is the top directory; linking to an upper directory if the directory is not the top directory; and updating the allocated capacity of the upper directory. A related system is also disclosed.

13 Claims, 4 Drawing Sheets

SYSTEMS AND METHOD FOR CONTROLLING DIRECTORY CAPACITIES WITH AN ACCURACY TOLERANT RATIO

BACKGROUND OF THE INVENTION

1. Field of the Invention

The present invention relates generally to storage and maintenance of computer documents, and more particularly to a system and method for controlling directory capacities with an accuracy tolerant ratio.

2. General Background

Traditional approach to manage documents on disks is limiting the capacity quote of a corresponding directory. By this method, the directory has two parameters: limit capacity and occupied capacity. When any updating operation is made to documents, the process may include: applying for a capacity on the disk; linking to a corresponding directory; then checking whether the remaining capacity (limit capacity minus occupied capacity) is greater than the applied capacity; updating the documents and the occupied capacity if the remaining capacity is larger than the applied capacity; and updating upper directories' occupied capacities by repeating the above described steps. During these procedures, every time the updating operation is implemented, the corresponding directories' parameters should also be updated, thus loading a heavy burden to read/write operations to disks and causing damage to the disks and data crash.

What is needed, therefore, is a system and method which can reduce read/write operations to disks and provide high efficiency and safety of data maintenance.

SUMMARY

A system for controlling directory capacities with an accuracy tolerant ratio in accordance with one preferred embodiment of the present invention includes: a shared disk for storage of files and directories, information on each directory comprising a limit capacity, a report capacity, an allocated capacity and an occupied capacity, the directories being divided into controlled directories and uncontrolled directories; and a directory management module for: determining whether a remaining capacity of a directory is greater than or equal to an applied capacity, and updating an occupied capacity of the directory if the remaining capacity of the directory is greater than or equal to the applied capacity; checking whether a sum of an occupied capacity and a corresponding allocated capacity is greater than an accuracy tolerance of a report capacity, and updating directory information of the directory if the sum of the occupied capacity and the allocated capacity is less than the accuracy tolerance of the report capacity, and updating the report capacity of the directory if the sum of the occupied capacity and the allocated capacity is greater than the accuracy tolerance of the report capacity.

A method for controlling directory capacities with an accuracy tolerant ratio in accordance with another preferred embodiment of the present invention includes the steps of: applying for a capacity; linking to a directory; checking whether a remaining capacity is greater than or equal to the applied capacity; updating an occupied capacity of the directory if the remaining capacity is greater than or equal to the applied capacity; checking whether the occupied capacity is greater than an accuracy tolerance of difference between a report capacity and an allocated capacity; updating the report capacity of the directory if the sum is greater than the accuracy tolerance of the report capacity; checking whether the directory is the top directory; linking to an upper directory if the directory is not the top directory; and updating the allocated capacity of the upper directory.

Other advantages and novel features of the invention will become more apparent from the following detailed description when taken in conjunction with the accompanying drawings, in which:

DETAIL DESCRIPTION OF THE PREFERRED EMBODIMENT

Figure 1:
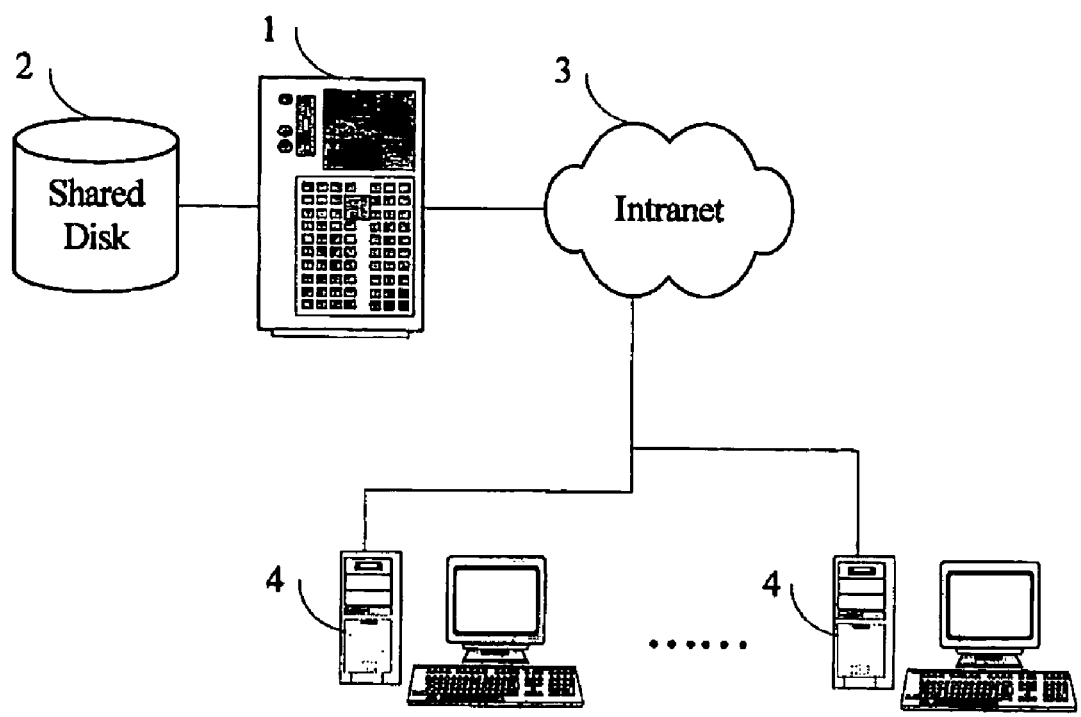
FIG. 1 is a schematic diagram of hardware configuration of a system for controlling directory capacities with an accuracy tolerant ratio in accordance with a preferred embodiment of the present invention.

FIG. 1 is a schematic diagram of hardware configuration of a system for controlling directory capacities with an accuracy tolerant ratio. As shown, a shared disk 2 is connected to a server 1. The server 1 is connected to pluralities of user computers 4 by a network 3. In this preferred embodiment, the network 3 is an Intranet. It should be noted that the invention is not so limited, and the network 3 can also be the Internet, or any other suitable type of communications link.

The shared disk 2 is for storage of documents which can be read or updated by the user computers 4 in accordance with their own authorities. The server 1 is used to manage data access and maintenance of the shared disk 2. The user computers 4 can keep connections to the server 1, send data processing requests to the server 1, and receive data processing results from the server 1.

Figure 2:
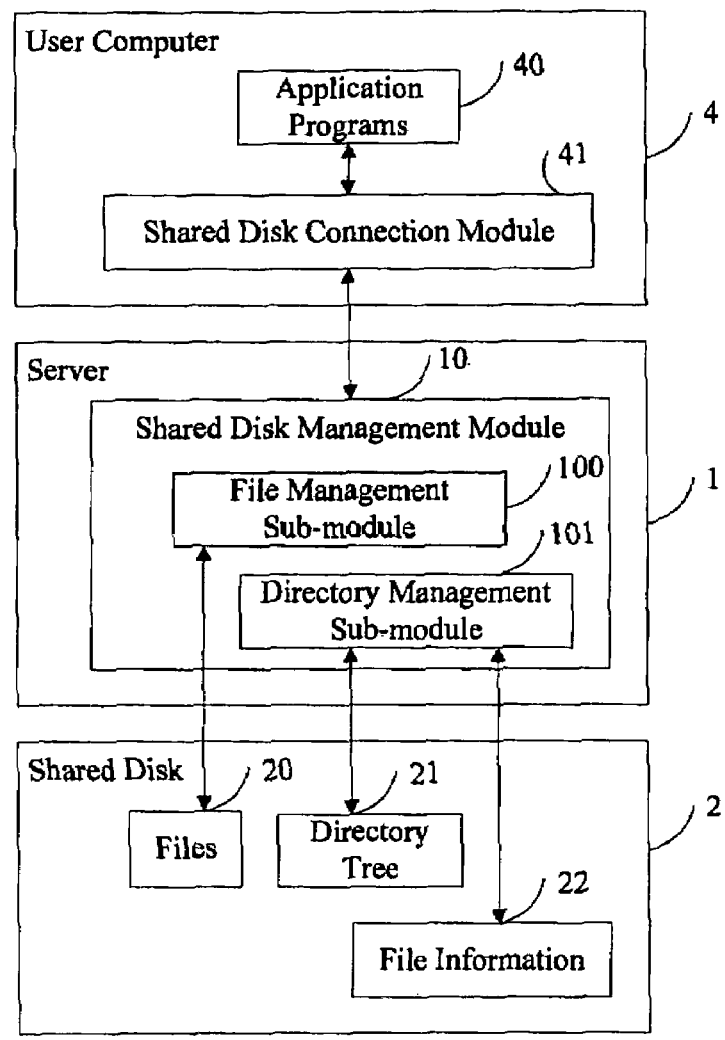
FIG. 2 is a block diagram of main function modules of the server of FIG. 1 and one user computer and relevant information stored in the shared disk of FIG. 1.

FIG. 2 is a block diagram of main function modules of the server 1 and one user computer 4, and also shows relevant information stored in the shared disk 2. The user computer 4 has some application programs 40 and a shared disk connection module 41. The shared disk connection module 41 sends data processing requests from the application programs 40 to the server 1, and returns responses or data processing results from the server 1 and the shared disk 2 to the user computer 4.

The server 1 mainly has a shared disk management module 10 as shown in FIG. 2 (other basic function units are not labeled), which further includes: a file management sub-module 100 for processing data in files 20 stored in the shared disk 2; a directory management sub-module 101 for processing data in a directory tree 21 stored in the shared disk 2. The shared disk 2 also stores file information 22. The directory management sub-module 101 can control both the directory information 21 and the file information 22.

Figure 3:
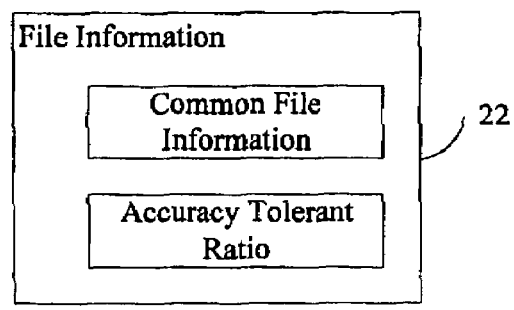
FIG. 3 is a schematic diagram illustrating main contents of the file information in FIG. 2.

FIG. 3 is a schematic diagram illustrating main contents of the file information 22. The file information 22 is used to describe statuses of the files 20 and includes: common file information 22 such as file names, creation times, etc.; and an accuracy tolerant ratio. The accuracy tolerant ratio is a floating-point decimal less than 1.

Figure 4:
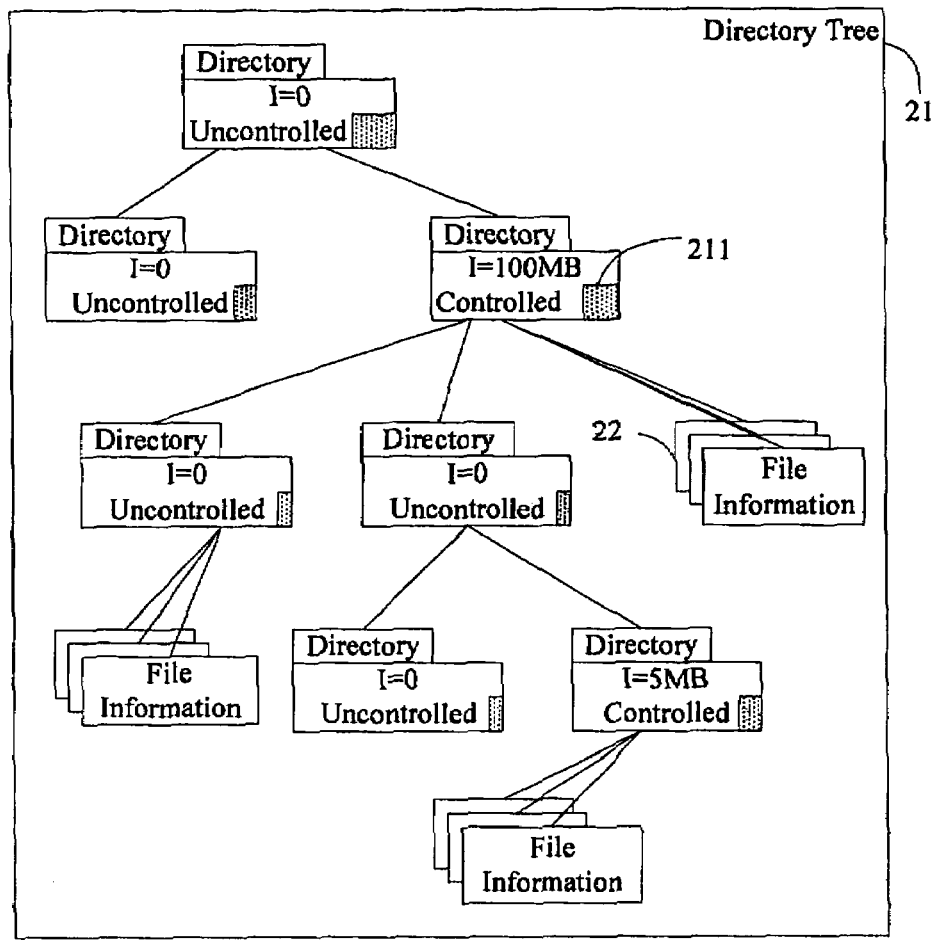
FIG. 4 is a schematic diagram of the structure of a directory tree used.

FIG. 4 is a schematic diagram illustrating the structure of the directory tree 21. The structure is a logical result showing the controlling mechanism of relevant directories and documents. As seen, the directory tree 21 has a plurality of directory levels. Each directory may have pluralities of file information 22 attached in its lower level. The directories each have their own directory information 211, which is described in FIG. 5 below. In this preferred embodiment, not all directories are controlled by the accuracy tolerant control mechanism. Only particular directories are controlled by this mechanism. For example, if a limit capacity of a directory is assigned 0 KB (Kilo-Byte), it is regarded as an uncontrolled directory. If the limit capacity of the directory is assigned a capacity more than 0, for example, 50 KB, this directory is regarded as a controlled directory. The limit capacity of each controlled directory must be smaller than or equal to that of an upper controlled directory.

Figure 5:
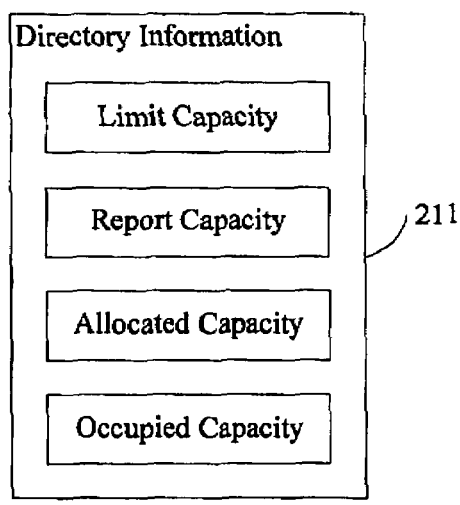
FIG. 5 is a schematic diagram illustrating contents of the directory information in FIG. 4.

FIG. 5 is a schematic diagram illustrating contents of the directory information 211. The directory information 211 typically includes a limit capacity, a report capacity, an allocated capacity and an occupied capacity. The limit capacity limits a capacity of the directory, which can be used to identify controlled directories and uncontrolled directories. That is, if the limit capacity of a directory is not 0 KB, the directory is a controlled directory, otherwise, if the limit capacity of a directory is 0 KB, the directory is an uncontrolled directory. The report capacity is a capacity that a directory reports to its upper directory. The allocated capacity is a sum of report capacities of all lower directories. The occupied capacity is a capacity occupied by all files included in the directory. The report capacity of a directory must be smaller than or equal to the limit capacity thereof. The occupied capacity and the allocated capacity are used to check whether an updating capacity of the files 20 is greater than an accuracy tolerance of the report capacity.

Figure 6:
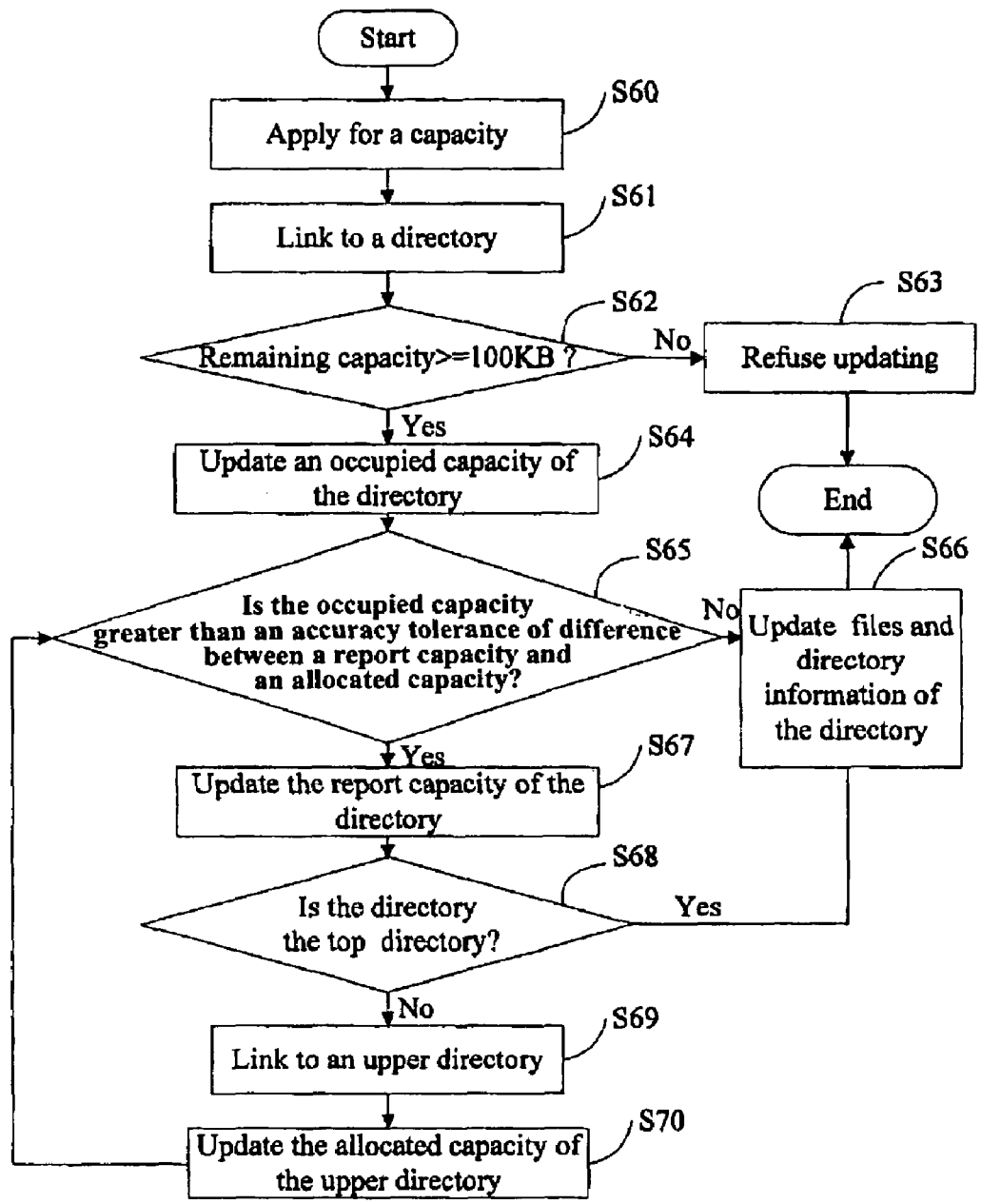
FIG. 6 is a flowchart of a preferred method for controlling directory capacities with an accuracy tolerant ratio.

FIG. 6 is a flowchart of a preferred method for controlling directory capacities with an accuracy tolerant ratio. When there is a need to update the files 20, in step S60, an application program firstly applies for a capacity. Because the updating may be adding files or deleting files, the applied capacity can be an integer greater than zero, equal to zero, or less than zero. Commonly, the applied capacity is measured by KB. In this preferred embodiment, it is assumed that the applied capacity is 100 KB due to adding files. In step S61, the directory management sub-module 101 links to a corresponding directory, in which the file information 22 is to be updated. In step S62, the directory management sub-module 101 checks the directory information 211 to determine whether a remaining capacity of the directory is greater than or equal to 100 KB. If the directory is a controlled directory, the remaining capacity is calculated by the formula: remaining capacity=((limit capacity−allocated capacity)*(1+accuracy tolerant ratio))−occupied capacity. If the directory is an uncontrolled directory, the remaining capacity is a sum of its remaining tolerant capacity and its upper directory's remaining capacity. To this uncontrolled directory, if the directory is the top directory, then its remaining tolerant capacity is calculated by the formula: remaining tolerant capacity=the whole capacity of the shared disk 2−occupied capacity−allocated capacity* (1+accuracy tolerant ratio); and if the directory is not the top directory, the remaining tolerant capacity is calculated by the formula: the remaining tolerant capacity= (report capacity−occupied capacity)*(1+accuracy tolerant ratio)−occupied capacity.

If the remaining capacity of the directory or of the share disk 2 is smaller than 100 KB, the updating of the files 20 is refused in step S63, the procedure is ended. Otherwise, if the remaining capacity of the directory is greater than or equal to 100 KB, in step S64, the directory management sub-module 101 updates an occupied capacity of the directory by adding 100 KB to the occupied capacity. In step S65, the directory management sub-module 101 checks whether a sum of the new occupied capacity and the allocated capacity is greater than an accuracy tolerance of the report capacity. Namely, the directory management sub-module 101 determines whether the following formula is satisfied: new occupied capacity> (report capacity−allocated capacity)*(1+accuracy tolerant ratio). However, in situations of deleting files, i.e. if the applied capacity in step S60 is less than zero, the formula should be: new occupied capacity<(report capacity−allocated capacity)*(1−accuracy tolerant ratio).

If the new occupied capacity is less than the accuracy tolerance of difference between the report capacity and the allocated capacity, in step S66, the file management sub-module 100 updates the files 20, and the directory management sub-module 101 updates the directory information 211 of the directory, then the procedure ends. If the new occupied capacity is greater than the accuracy tolerance of difference between the report capacity and the allocated capacity, in step S67, the directory management sub-module 101 updates the report capacity of the directory by adding 100 KB to the report capacity. If the new report capacity is larger than the limit capacity of the upper directory, the directory management sub-module 101 demands for more space for excessive data for the upper directory and modifies the report capacity as large as the limit capacity of the upper directory.

In step S68, the directory management sub-module 101 checks whether the directory is the top directory. If it is the top directory, the procedure goes to step S66 described above; if it is not the top directory, then in step S69, the directory management sub-module 101 links to the upper directory. In step S70, the directory management sub-module 101 updates the allocated capacity of the upper directory. Then, the procedure returns to step S65 described above.

Although the present invention has been specifically described on the basic of a preferred embodiment and a preferred method, the invention is not to be construed as being limited thereto. Various changes and modifications may be made to the embodiment and the method without departing from the scope and spirit of the invention.

I claim:

1. A system for controlling directory capacities with an accuracy tolerant ratio, comprising:

a shared disk for storage of files and directories, information on each directory comprising a limit capacity, a report capacity, an allocated capacity and an occupied capacity, the directories being divided into controlled directories and uncontrolled directories; and a directory management module for: determining whether a remaining capacity of a directory is greater than or equal to an applied capacity, and updating an occupied capacity of the directory if the remaining capacity of the directory is greater than or equal to the applied capacity; checking whether an occupied capacity is greater than an accuracy tolerance of a difference between a report capacity and a corresponding allocated capacity, and updating directory information of the directory if the occupied capacity is less than the accuracy tolerance of the difference between the report capacity and the allocated capacity, and updating the report capacity of the directory if the occupied capacity is greater than the accuracy tolerance of the difference between the report capacity and the allocated capacity.

2. The system according to claim 1, wherein the directory management module is further used to determine whether the directory is the top directory, and is used to update directory information of the directory if the directory is the top directory and update the allocated capacity of the directory if the directory is not the top directory.

3. The system according to claim 1, wherein the report capacity is a capacity that a directory reports to an upper directory.

4. The system according to claim 1, wherein the allocated capacity is a sum of report capacities of all lower directories.

5. The system according to claim 1, wherein the occupied capacity is a capacity occupied by all files included in the directory.

6. The system according to claim 1, wherein the controlled directories are directories whose limit capacities are not zero, and the uncontrolled directories are directories whose limit capacities are zero.

7. The system according to claim 1, wherein the accuracy tolerance is set via a tolerant accuracy ratio.

8. A method for controlling directory capacities with an accuracy tolerant ratio, comprising the steps of:
applying for a capacity;
linking to a directory;
checking whether a remaining capacity is greater than or equal to the applied capacity;
updating an occupied capacity of the directory if the remaining capacity is greater than or equal to the applied capacity;
checking whether the occupied capacity is greater than an accuracy tolerance of a difference between a report capacity and an allocated capacity;
updating the report capacity of the directory if the occupied capacity is greater than the accuracy tolerance;
checking whether the directory is a top directory; linking to an upper directory if the directory is not the top directory; and updating the allocated capacity of the upper directory.

9. The method according to claim 8, wherein the step of checking whether a remaining capacity is greater than or equal to the applied capacity comprises the step of refusing the updating if the remaining capacity is less than the applied capacity.

10. The method according to claim 8, wherein the step of checking whether the occupied capacity is greater than an accuracy tolerance of the difference between a report capacity and an allocated capacity comprises the step of: updating files and directory information of the directory if the occupied capacity is less than the accuracy tolerance.

11. The method according to claim 8, wherein the step of checking whether the directory is the top directory comprises the step of updating files and directory information of the directory if the directory is the top directory.

12. A method for controlling and managing capacity information of directories in a directory tree of a system, comprising the steps of:
defining an accuracy tolerance for each of predetermined directories of said directory tree;
retrieving information of an available update of a file residing in a directory of said predetermined directories of said directory tree;
updating capacity information of said directory having said file according to said information of said available update;
reporting to update capacity information of other directories upper than said directory in said directory tree according to said information of said available update when said information of said available update is identifiable to exceed said accuracy tolerance of said directory having said file; and
disregarding said reporting step when said information of said available update is identifiable within said accuracy tolerance of said directory having said file.

13. The method according to claim 12, wherein said accuracy tolerance is expressed by an accuracy tolerant rate calculable with said capacity information of said directory having said file.

* * * * *